(12) United States Patent
Nishiguchi

(10) Patent No.: US 11,165,970 B2
(45) Date of Patent: Nov. 2, 2021

(54) IMAGE PROCESSING APPARATUS, IMAGING APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventor: Tatsuya Nishiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/906,945

(22) Filed: Jun. 19, 2020

(65) Prior Publication Data

US 2020/0404153 A1 Dec. 24, 2020

(30) Foreign Application Priority Data

Jun. 21, 2019 (JP) .............................. JP2019-115381

(51) Int. Cl.
*H04N 5/235* (2006.01)
*H04N 9/73* (2006.01)
*H04N 9/69* (2006.01)
*G06T 5/40* (2006.01)

(52) U.S. Cl.
CPC ............. *H04N 5/2355* (2013.01); *G06T 5/40* (2013.01); *H04N 9/69* (2013.01); *H04N 9/735* (2013.01)

(58) Field of Classification Search
CPC ..................................................... H04N 5/2355
USPC ....................................................... 348/222.1
See application file for complete search history.

(56) References Cited

U.S. PATENT DOCUMENTS

| | | | |
|---|---|---|---|
| 8,606,009 B2* | 12/2013 | Sun ........................... | G06T 7/20 382/169 |
| 10,187,584 B2* | 1/2019 | Thumpudi ........... | H04N 5/2355 |

FOREIGN PATENT DOCUMENTS

| | | |
|---|---|---|
| JP | 2015-050688 A | 3/2015 |
| JP | 2017-068207 A | 4/2017 |
| JP | 2018-007194 A | 1/2018 |

* cited by examiner

*Primary Examiner* — Joel W Fosselman
(74) *Attorney, Agent, or Firm* — Cowan, Liebowitz & Latman, P.C.

(57) ABSTRACT

An image processing apparatus comprising at least one memory and at least one processor which function as: an acquisition unit configured to acquire a moving image; and a generation unit configured to generate a thumbnail image from the moving image, wherein in a case where the moving image is a high dynamic range (HDR) moving image, the generation unit generates the thumbnail image of which gamma is equal to a gamma of the moving image and bit depth is lower than a bit depth of the moving image.

13 Claims, 6 Drawing Sheets

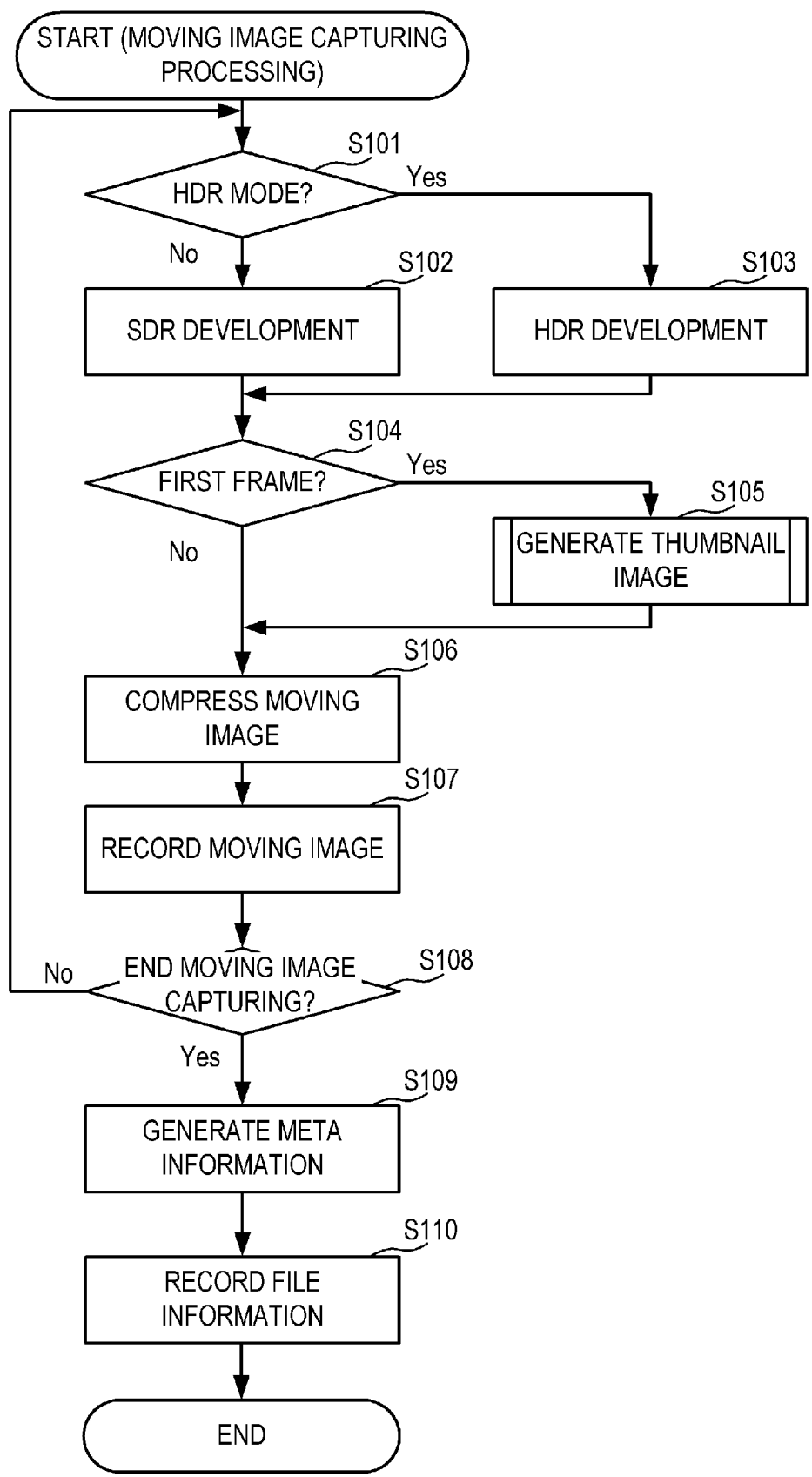

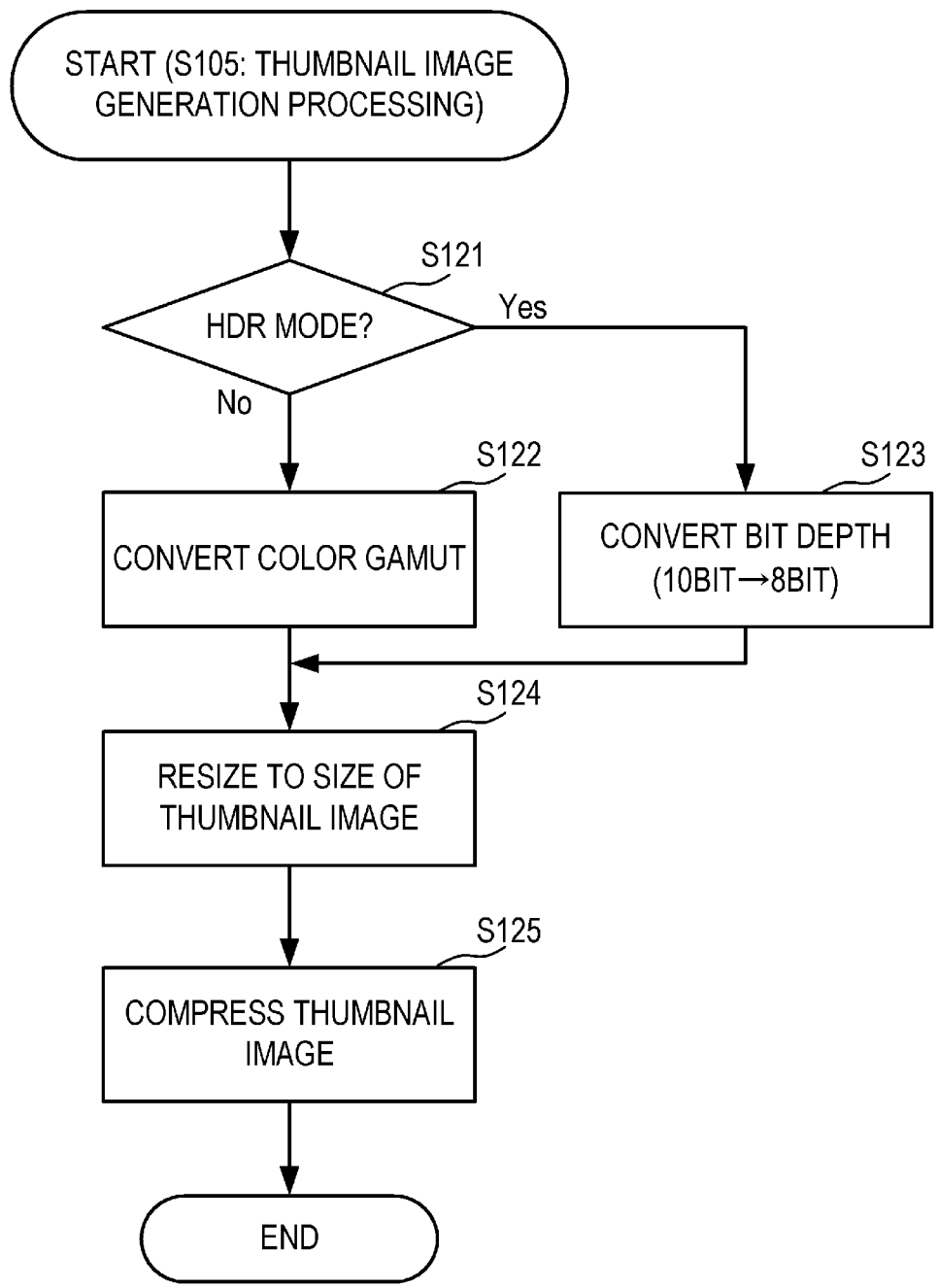

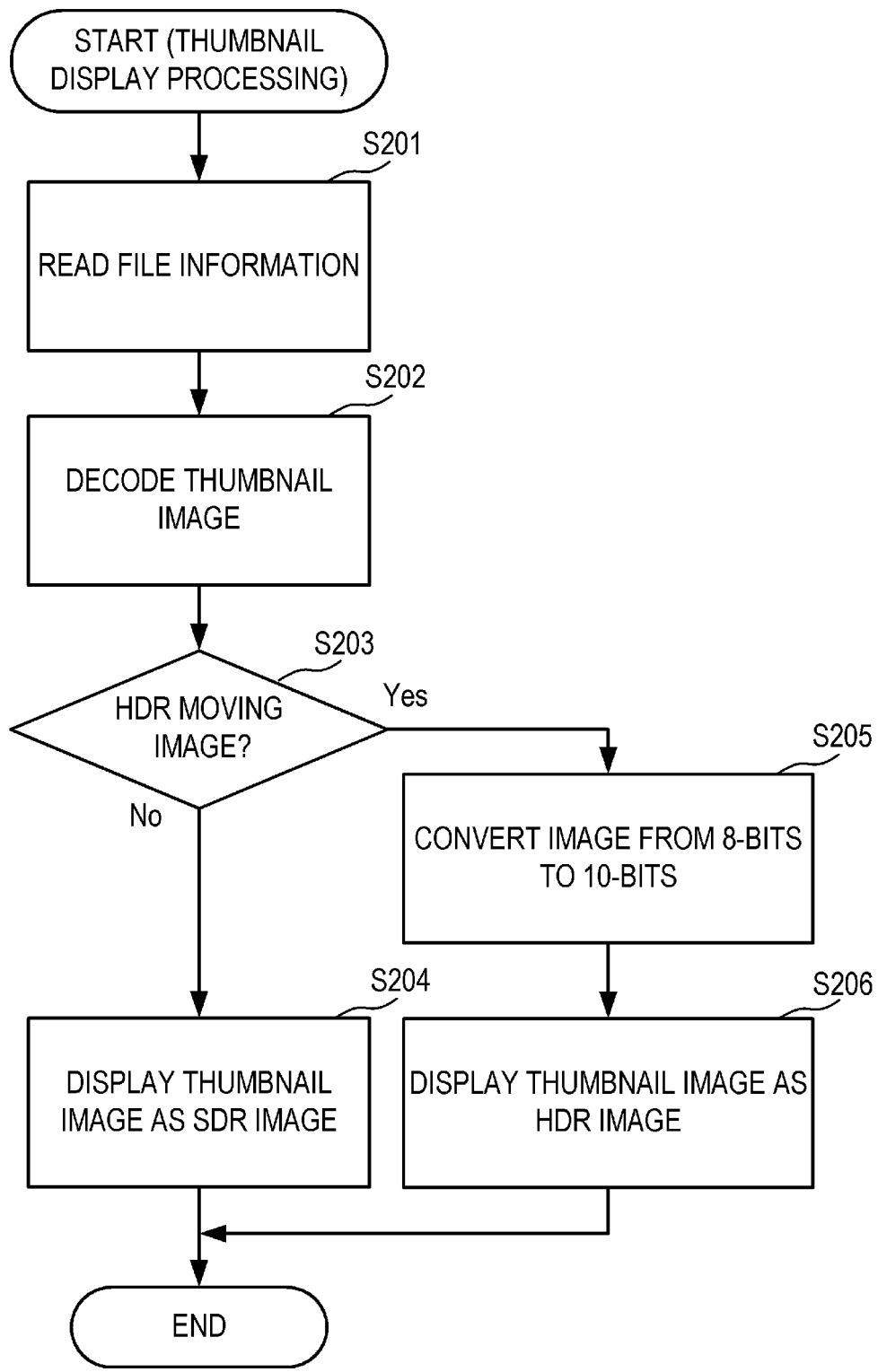

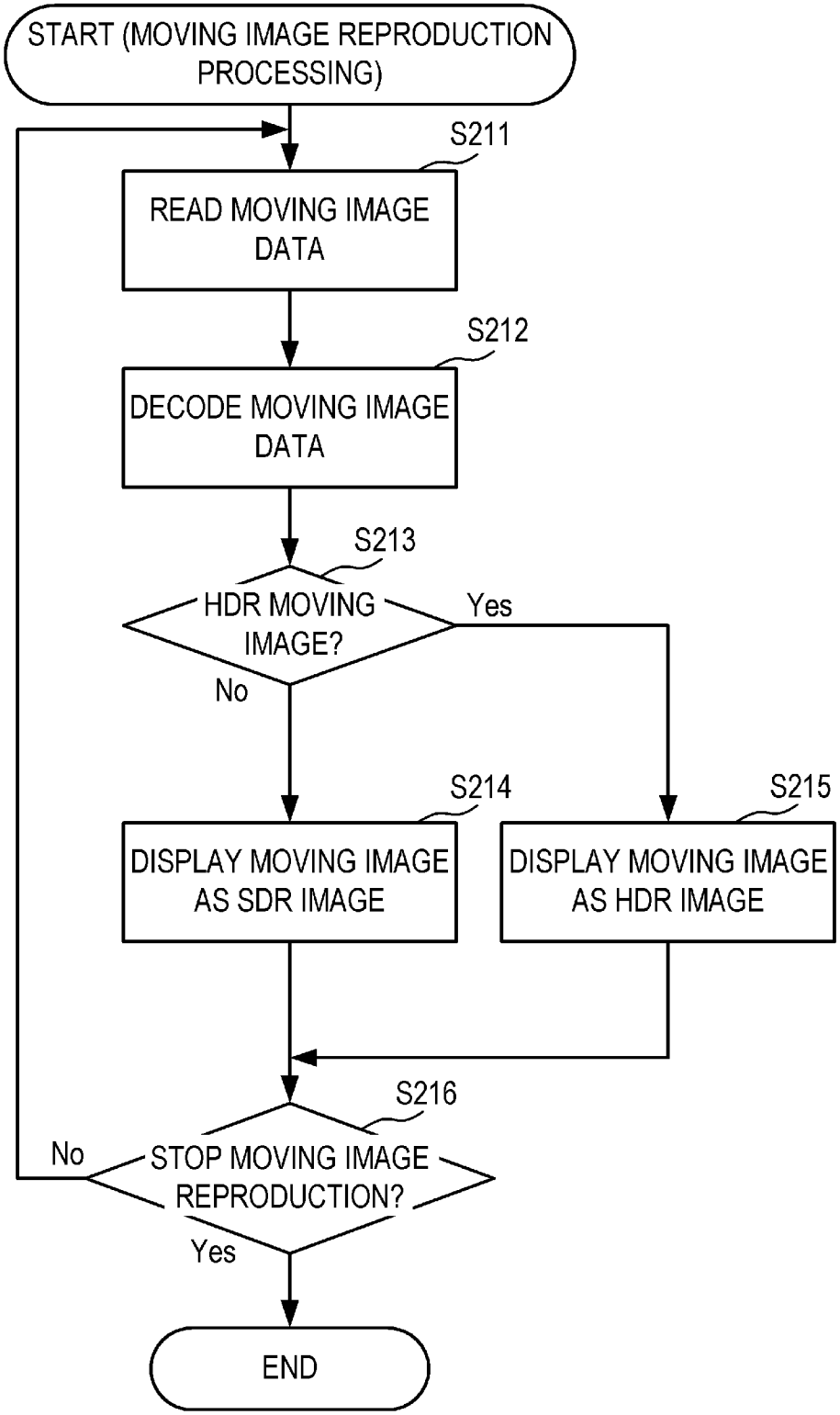

IMAGE PROCESSING APPARATUS, IMAGING APPARATUS, IMAGE PROCESSING METHOD, AND NON-TRANSITORY COMPUTER READABLE MEDIUM

BACKGROUND OF THE INVENTION

Field of the Invention

The present invention relates to an image processing apparatus, an imaging apparatus, an image processing method and a non-transitory computer readable medium.

Description of the Related Art

An imaging apparatus in recent years, represented by a digital camera, can capture a high dynamic range (HDR) image, and record the HDR image in a recording medium. An HDR image here refers to an image having a wider dynamic range than a standard dynamic range (SDR).

A RAW image refers to a raw image before development. A currently available technique to record the content of an HDR image (HDR moving image) is a technique to record the content along with identification information that indicates whether the content is an HDR moving image (Japanese Patent Application Publication No. 2018-007194).

SUMMARY OF THE INVENTION

In some cases when an HDR moving image is recorded, the HDR image cannot be kept as a thumbnail image. For example, this is a case when an HDR image is recorded in a same moving image format as an SDR moving image (container format) to maintain compatibility with the SDR moving image. In the case of a moving image format that is the same as an SDR moving image, only an 8-bit thumbnail image can be recorded; in other words, a 10-bit HDR image cannot be recorded as a thumbnail image, and an 8-bit SDR image is recorded as the thumbnail of the HDR moving image. In this case, the thumbnail of the HDR moving image cannot be displayed at an HDR image quality.

With the foregoing in view, it is an object of the present invention to provide a technique to display a thumbnail of an HDR moving image at an HDR image quality.

An aspect of the present invention is:

an image processing apparatus comprising at least one memory and at least one processor which function as:

an acquisition unit configured to acquire a moving image; and a generation unit configured to generate a thumbnail image from the moving image, wherein in a case where the moving image is a high dynamic range (HDR) moving image, the generation unit generates the thumbnail image of which gamma is equal to a gamma of the moving image and bit depth is lower than a bit depth of the moving image.

An aspect of the present invention is:

an image processing method, comprising:

an acquisition step of acquiring a moving image;

a generation step of generating a thumbnail image from the moving image, wherein in a case where the moving image is a high dynamic range (HDR) moving image, the thumbnail image of which gamma is equal to a gamma of the moving image and bit depth is lower than a bit depth of the moving image is generated in the generation step.

An aspect of the present invention is a non-transitory computer readable medium that stores a program to cause a computer to execute each step of the above-mentioned method.

Further features of the present invention will become apparent from the following description of exemplary embodiments with reference to the attached drawings.

BRIEF DESCRIPTION OF THE DRAWINGS

FIG. 3A is a flow chart depicting a moving image capturing processing according to the present embodiment;

FIG. 3B is a flow chart depicting a thumbnail image generation processing according to the present embodiment;

FIG. 4A is a flow chart depicting a thumbnail display processing according to the present embodiment; and FIG. 4B is a flow chart depicting a moving image reproduction processing according to the present embodiment.

DESCRIPTION OF THE EMBODIMENTS

Embodiment

Figure 1A:
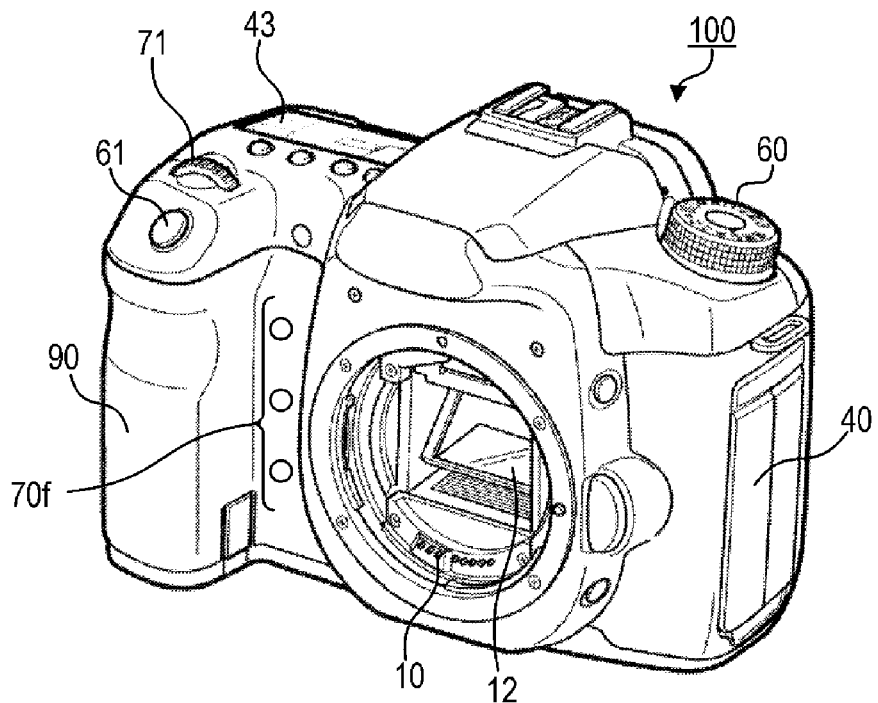
FIG. 1A and FIG. 1B are external views of a digital camera according to the present embodiment.
Figure 1B:
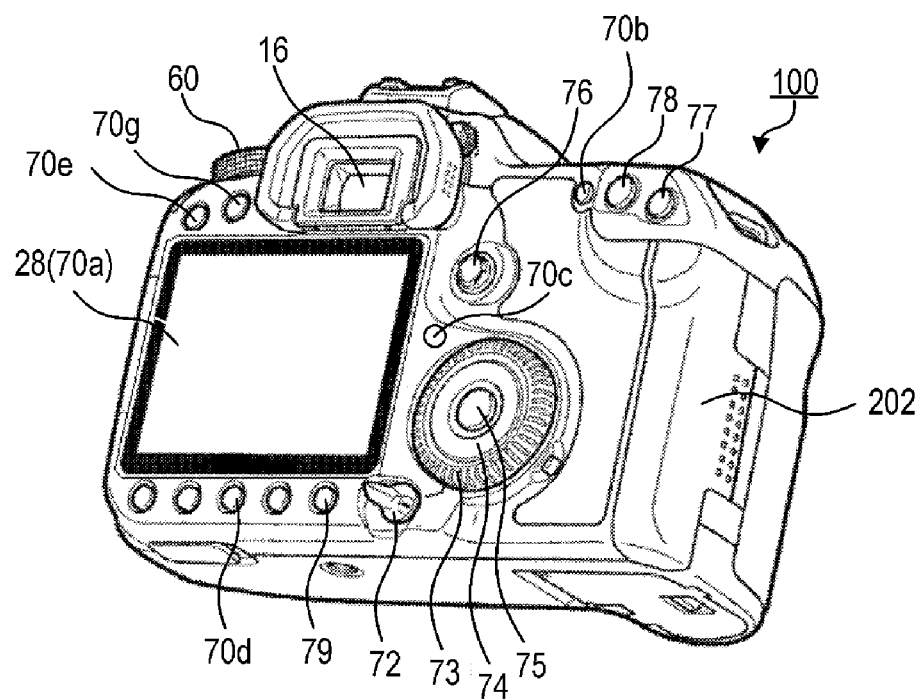

A preferred embodiment of the present invention will be described with reference to the drawings. FIG. 1A and FIG. 1B are external views of a digital camera 100, which is an example of an apparatus to which the present invention is applicable. FIG. 1A is a front perspective view of the digital camera 100, and FIG. 1B is a rear perspective view of the digital camera 100. In FIG. 1A and FIG. 1B, a same or similar configuration is denoted with a same reference number, and redundant description thereof will be omitted.

A display unit 28 is a display unit that is disposed on a rear surface of the digital camera 100, and displays an image and various information. An outer finder display unit 43 is a display unit disposed on an upper surface of the digital camera 100, and displays various set values of the digital camera 100, such as shutter speed and aperture. A terminal cover 40 is a cover to protect connectors (not illustrated), such as a connection cable, to connect the digital camera 100 to an external apparatus. A quick return mirror 12 is moved up or down by an actuator (not illustrated) based on an instruction from a system control unit 50 (described later). A communication terminal 10 is a communication terminal for the digital camera 100 to communicate with a lens unit 150 (detachable, described later). An eyepiece finder 16 is a peep type finder to view a focusing screen 13 (described later), so as to confirm a focal point and composition of an optical image of an object acquired through the lens unit 150. A cover 202 is a cover of a slot to store a recording medium 200 (described later). A grip unit 90 is a holding unit having a shape such that the user can hold the digital camera 100 with their right hand when capturing images.

The digital camera 100 also includes a mode selection switch 60, a shutter button 61, a main electronic dial 71, a power switch 72, a sub-electronic dial 73, a four-direction key 74, a SET button 75 and an LV button 76. Furthermore, the digital camera 100 includes an enlargement button 77, a reduction button 78, a reproduction button 79, a touch panel 70a, an AF-ON button 70b, a quick setting button 70c, a menu button 70e, a function button 70f and an information button 70g. The digital camera 100 may include other operation members. The various operation members mentioned above will be described later.

Figure 2:
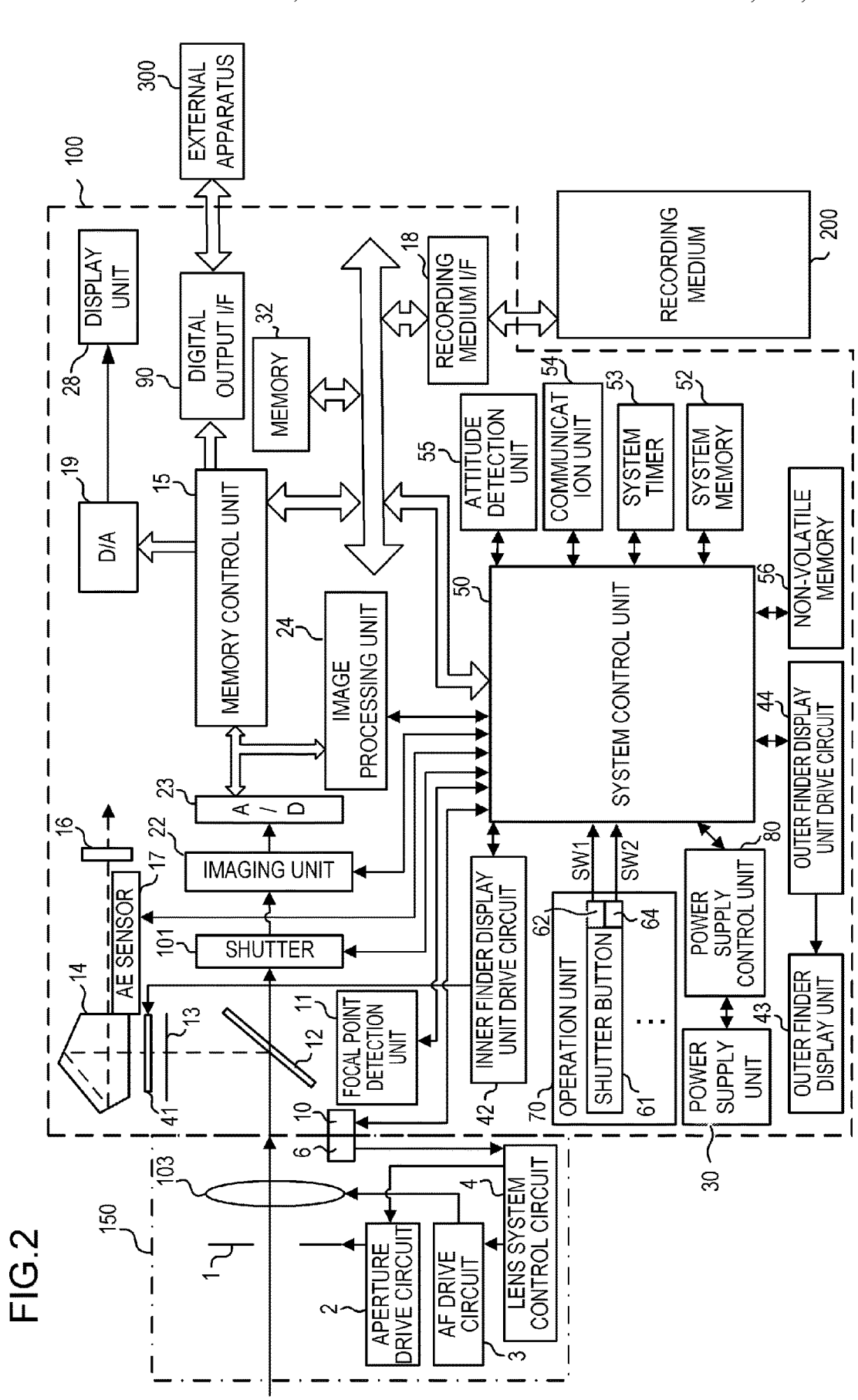
FIG. 2 is a block diagram depicting a digital camera according to the present embodiment.

FIG. 2 is a block diagram depicting a configuration example of the digital camera 100.

The lens unit 150 is a lens unit equipped with a replaceable image capturing lens. A lens 103 is normally constituted of a plurality of lenses, but is illustrated as one lens in FIG. 2 for simplification. A communication terminal 6 is a communication terminal for the lens unit 150 to communicate with the digital camera 100, and the communication terminal 10 is a communication terminal for the digital camera 100 to communicate with the lens unit 150. The lens unit 150 communicates with a system control unit 50 via communication terminals 6 and 10. Then the lens unit 150 controls an aperture 1 via an aperture drive circuit 2 using an internal lens system control circuit 4. The lens unit 150 also performs focusing by moving the position of the lens 103 via an AF drive circuit 3 using the lens system control circuit 4.

An auto exposure (AE) sensor 17 measures brightness of an object (object light) through the lens unit 150.

A focal point detection unit 11 outputs defocus amount information to the system control unit 50. Based on the defocus amount information, the system control unit 50 controls the lens unit 150, and performs phase difference AF.

The quick return mirror 12 (hereafter mirror 12) is moved up or down by an actuator (not illustrated) based on an instruction from the system control unit 50 when exposure, live view image capturing, moving image capturing and the like are performed. The mirror 12 is a mirror to switch a luminous flux entered from the lens 103 between a finder 16 side and an imaging unit 22 side. The mirror 12 is disposed to guide the luminous flux to the finder 16 (to reflect the luminous flux) in a normal state (mirror down), but when image capturing or live view display is performed, the mirror 12 is moved up from the luminous flux so that the luminous flux is guided to the imaging unit 22 (mirror up). The mirror 12 is a half-mirror, of which center portion allows part of the light to transmit through, and transmits a part of the luminous flux so that the light enters the focal point detection unit 11 to detect a focal point.

The user views the focusing screen 13 via a penta prism 14 and a finger 16, where by the focal point and composition of an optical image of an object acquired through the lens unit 150 can be confirmed.

A shutter 101 is a focal plane shutter that can freely control the exposure time of the imaging unit 22 based on the control by the system control unit 50.

The imaging unit 22 (image capturing apparatus) is an image pickup element constituted by a CCD, a CMOS element or the like, to convert an optical image into electric signals. Filters, each of which has an R, G or B color component, is cyclically disposed two-dimensionally on the imaging surface of the imaging unit 22. In 2×2 adjacent filter, two filters having a G component are disposed on diagonal positions, and a filter having an R component and a filter having a B component are disposed on the other two positions. These 2×2 filters are arrayed on the imaging surface of the imaging unit 22. This array is normally called a "Bayer array". This means that the image expressed by a signal (analog signal) that is output from the imaging unit 22 is also a pixel signal having the Bayer array. An A/D convertor 23 converts an analog signal that is output from the imaging unit 22 into a digital signal. In this stage, the image data is image data having a Bayer array, where one pixel has one component and 10 bits are assigned for each component, as mentioned above, and is undeveloped image data. Therefore the image data in this stage is called "RAW image data". Image data having a Bayer array after correcting defective pixels may be regarded as RAW image data. In the present embodiment, it is assumed that the A/D convertor 23 converts an analog signal into a 10-bit digital data, but this number of bits may be any number that exceeds 8 bits, and is not particularly limited. As the number of bits increases, higher gradation representation becomes possible.

An image processing unit 24 performs a predetermined processing (e.g. pixel interpolation; resizing, such as reduction; color conversion processing) on the data from the A/D convertor 23 or on the data from a memory control unit 15. The image processing unit 24 also performs a predetermined arithmetic processing using the captured image data, and the system control unit 50 performs exposure control and distance measurement control based on the acquired arithmetic result. Thereby through-the-lens (TTL) type auto focus (AF) processing, auto exposure (AE) processing, pre-flash emission (EF) processing and the like are performed. Further, the image processing unit 24 performs a predetermined arithmetic processing using the captured image data, and performs TTL type auto white balance (AWB) processing based on the acquired arithmetic result. Furthermore, the image processing unit 24 also performs encoding/decoding processing on the image data under control of the system control unit 50. This encoding includes JPEG, HEVC and the like. JPEG is for encoding image data where one color component has 8 bits, and HEVC is for encoding image data where one color component has more than 8 bits.

The output data from the A/D convertor 23 is directly written to the memory 32 via the image processing unit 24 and the memory control unit 15, or via the memory control unit 15. The memory 32 stores image data which was acquired by the imaging unit 22 and converted into digital data by the A/D convertor 23, or the image data to be displayed on the display unit 28 or the external apparatus 300. The memory 32 has a sufficient storage capacity to store a predetermined number of still images, and a predetermined time of moving images and sounds.

The memory 32 is also a memory for image display (video memory). A D/A convertor 19 converts the data for image display that is stored in the memory 32 into an analog signal, and supplies the analog signal to the display unit 28. In this way, the image data for display, written in the memory 32, is displayed on the display unit 28 via the D/A convertor 19. The display unit 28 performs display on the display (e.g. LCD) in accordance with the analog signal from the D/A convertor 19. Live view display (through image display) can be performed by converting digital signals, which were converted from the analog signals by the A/D convertor 23 and stored in the memory 32, into analog signals by the D/A convertor 19, and by sequentially transferring the converted analog signals to the display unit 28 and displaying the analog signals, thereby realizing an electronic view finder function. An image displayed by the live view display is referred to as a "live view image".

In the inner finder display unit 41, a frame, to indicate a distance measuring point at which auto focus is currently performed (AF frame) and an icon, to indicate the setting state of the camera, are displayed via an inner finder display unit drive circuit 42.

On the outer finder display unit 43, various set values of the digital camera 100, such as shutter speed and aperture, are displayed via an outer finder display unit drive circuit 44.

The digital output I/F 90 supplies data for image display, stored in the memory 32, to an external apparatus 300 as digital signals. For example, the digital output I/F 90 outputs the moving image data in the stream format according to a communication protocol conforming to the high definition multimedia interface (HDMI)® standard. In this way, the image data for display, written in the memory 32, is displayed on the external apparatus 300. The external apparatus 300 is a display apparatus that can display a high dynamic range (HDR) moving image, and an HDR supported TV, display, monitor or the like is used.

A non-volatile memory 56 is a memory which is electrically erasable and recordable, such as EEPROM. In the non-volatile memory 56, constants and programs for operating the system control unit 50, for example, are stored. "Programs" here refers to the programs for executing various flow charts which are described later in the present embodiment.

The system control unit 50 is a control unit constituted of at least one processor or circuit, and controls the digital camera 100 in general. The system control unit 50 implements each processing of the present embodiment (described later) by executing the programs recorded in the above-mentioned non-volatile memory 56. A system memory 52 is a RAM, for example, and the system control unit 50 develops, in the system memory 52, the constants and variables for operating the system control unit 50 and programs read from the non-volatile memory 56. The system control unit 50 also controls display by controlling the memory 32, the D/A convertor 19, the digital output I/F 90, the display unit 28 and the like.

A system timer 53 is a clock unit that measures the time used for various controls and the time of the internal clock.

A power supply control unit 80 is constituted of a battery detection circuit, a DC-DC convertor, and switch circuits to switch to a block to be energized, and detects whether a battery is installed, the type of battery, and the residual amount of battery power, for example. The power supply control unit 80 also controls the DC-DC convertor based on the detection result and the instruction of the system control unit 50, and supplies the required voltage to each unit, including the recording medium 200, for a required period of time. A power supply unit 30 is constituted of a primary battery (e.g. alkali battery, lithium battery), a second battery (e.g. NiCd battery, NiMH battery, Li battery), an AC adaptor and the like.

A recording medium I/F 18 is an interface with the recording medium 200 (e.g. memory card, hard disk). The recording medium 200 is a recording medium to record captured images, such as a memory card, and is constituted of a semiconductor memory, a magnetic disk or the like.

A communication unit 54 transmits/receives video signals and sound signals to/from an external apparatus connected wirelessly or cable. The communication unit 54 can also be connected with a wireless local area network (LAN) and Internet. The communication unit 54 can also communicate with an external apparatus via Bluetooth® or with Bluetooth Low Energy. The communication unit 54 can transmit an image (including an LV image) captured by the imaging unit 22 and an image recorded in the recording medium 200, and can receive image data and various other information from an external apparatus.

An attitude detection unit 55 detects an attitude of the digital camera 100 with respect to the gravity direction. Based on the attitude detected by the attitude detection unit 55, it can be determined whether an image captured by the imaging unit 22 is an image captured by the digital camera 100 held horizontally, or an image captured by the digital camera 100 held vertically. The system control unit 50 can attach the orientation information in accordance with the attitude detected by the attitude detection unit 55 to an image file of an image captured by the imaging unit 22 (captured image), or can rotate and record the image. For the attitude detection unit 55, an acceleration sensor, a gyro sensor or the like can be used. The motion of the digital camera 100 (e.g. pan, tile, lift, remain still) can be detected using the acceleration sensor or gyro sensor of the attitude detection unit 55.

The operation unit 70 is an operation unit to input various operation instructions to the system control unit 50. The operation unit 70 includes various operation members that function as input units to receive operations from the user (user operations). The operation unit 70 includes a push button, a rotation dial and a touch sensor. In concrete terms, the operation unit 70 includes the mode selection switch 60, the shutter button 61, the main electronic dial 71, the power switch 72, the sub-electronic dial 73, the four-direction key 74, the SET button 75 and the LV button 76. The operation unit 70 also includes the enlargement button 77, the reduction button 78, the reproduction button 79, the touch panel 70a, the AF-ON button 70b, the quick setting button 70c, the menu button 70e, the function button 70f, and the info button 70g. A different function is assigned to each operation member of the operation unit 70 depending on a scene by selecting and operating various functional icons which are displayed on the display unit 28 or the external apparatus 300, whereby each operation member functions as a functional button. The functional buttons are, for example, an end button, a return button, an image forward button, a jump button, a preview button, and an attribute change button. If the menu button 70e is pressed, for example, the menu screen, which allows various settings, is displayed on the display unit 28 or the external apparatus 300. The user can intuitively perform various settings using the menu screen displayed on the display unit 28 or the external apparatus 300, the four-direction key 74 and the SET button 75.

The display unit 28 according to the present embodiment has an image display function at SDR image quality, that is, with each color component of R, G and B having 8 bits (256 gradations). If the external apparatus 300 is connected to the digital camera 100, the external apparatus 300 is set as an output target device to which the captured images and live images are output, instead of the display unit 28. In the case where the user explicitly selected the display unit 28 or the external apparatus 300 using the operation unit 70, the selected device becomes the output target device. Both the external apparatus 300 and the display unit 28 may be set as the output target device in the case where the external apparatus 300 is connected to the digital camera 100.

The mode selection switch 60 is an operation member to switch between various modes. The mode selection switch 60 switches the operation mode of the system control unit 50 to: still image recording mode, moving image capturing mode or reproduction mode, for example. The modes included in the still image recording mode are: auto image capturing mode, auto scene determination mode, manual mode, aperture priority mode (Av mode), shutter speed priority mode (Tv mode), and program AE mode. Various scene modes and custom modes, to perform image capturing settings for each image capturing scene, are also included. Using the mode selection switch 60, the user can directly select any one of these modes. The user may also select an image capturing mode list screen using the mode selection switch 60 first, then select any one of the plurality of modes displayed on the list using another operation member. In the same manner, a plurality of modes may be included in the moving image capturing mode.

The shutter button 61 is an operation member to instruct image capturing. The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts such an operation as AF processing, AE processing, AWB processing and EF processing. The second shutter switch 64 is turned ON when the operation of the shutter button 61 completes, that is, in the fully depressed state (image capturing instruction), and generates a second shutter switch signal SW2. By the second shutter switch signal SW2, the system control unit 50 starts a series of operations of the image capturing processing, from reading signals from the imaging unit 22 to writing the image data to the recording medium 200.

The main electronic dial 71 is a rotary operation member, and can change the set values, such as shutter speed and aperture, for example, by turning the main electronic dial 71. The power switch 72 is an operation member to switch the power of the digital camera 100 ON/OFF. The sub-electronic dial 73 is a rotary operation member, and can move a selection frame and advance to images, for example, by turning the sub-electronic dial 73. The four-direction key 74 is configured so that each of the upper, lower, left and right portions can be pressed. A processing in accordance with the pressed portion of the four-direction key 74 can be performed. The SET button 75 is a push button mainly used for determining a selected item. The four-direction key 74 is a directional button in which each upper, lower, left and right portion thereof can be pressed. In the present embodiment, the four-direction key 74 is an integrated operation unit, but the upper button, lower button, left button and right button may be independent buttons respectively. The upper or lower portion will be called a "vertical key", and the left or right portion will be called a "horizontal key" herein below.

The LV button 76 is a button to switch the live view (hereafter LV) ON/OFF in the still image capturing mode. In the moving image capturing mode, the LV button 76 is used to instruct the start/stop of moving image capturing (recording). The enlargement button 77 is an operation button to switch the ON/OFF of the enlargement mode in the LV display in the image capturing mode, and to change the magnification ratio used in the enlargement mode. In the reproduction mode, the enlargement button 77 functions as an enlargement button to enlarge a reproduced image or to increase the magnification ratio thereof. The reduction button 78 is a button to decrease the magnification ratio of the enlarged reproduced image, and to reduce the displayed image. The reproduction button 79 is an operation button to switch the image capturing mode and the reproduction mode. If the reproduction button 79 is pressed in the image capturing mode, the mode shifts to the reproduction mode, in which the latest image, out of the images recorded in the recording medium 200, can be displayed on the display unit 28.

The AF-ON button 70b is a button to instruct the execution of AF. The pressing direction of the AF-ON button 70b is parallel with the direction (optical axis) of the object light that enters from the lens 103 to the imaging unit 22.

The quick setting button 70c (hereafter Q button 70c) is a button to display a quick setting menu, which is a list of setting items that can be set in each operation mode. If this button is pressed during imaging standby of LV image capturing, a list of setting items, such as electronic front curtain shutter, brightness of monitor, WB in LV screen, two-point enlargement and silent image capturing, is displayed in a row, so as to be superimposed on the LV. If the user selects an arbitrary option from the displayed quick setting menu using the vertical key and pressing the set button, the setting on the selected setting item can be changed or mode can be shifted to the selected operation mode.

The active frame selection button 70d is a button to switch an active enlarging position (frame) out of the two enlarging points by being pressed in the later mentioned two-point enlargement processing. Further, a different function is assigned to the active frame selection button 70d, and if the active frame selection button 70d is pressed in the reproduction mode, a protection attribute can be provided to the currently displayed image.

The menu button 70e is a button to display a menu screen, in which various settings can be performed, on the display unit 28 or the external apparatus 300.

The function buttons 70f are buttons to which different functions are assigned respectively. Each function button 70f is disposed at a position that can be operated by a finger (middle finger, ring finger or little finger) of the right hand holding the grip unit 90, and the pressing direction is parallel with the direction of the object light (optical axis) that enters from the lens 103 to the imaging unit 22.

The info button 70g is a button used for switching various information that can be displayed.

The touch panel 70a detects contact to the touch panel 70a. The touch panel 70a and the display unit 28 can be integrated. For example, the touch panel 70a is configured so that the transmittance of the light does not interfere with the display on the display unit 28, and is superimposed on the upper layer of the display surface of the display unit 28. Then the input coordinates on the touch panel 70a are corresponded with the display coordinates on the display unit 28. Thereby a graphical user interface (GUI), which allows the user to directly operate the screen displayed on the display unit 28, can be provided. The system control unit 50 can detect the following operations on the touch panel 70a or the state thereof A finger or pen which is not touching the touch panel 70a touches the touch panel 70a, that is, touch is started (hereafter Touch-Down).

A finger or pen is touching the touch panel 70a (hereafter Touch-On).

A finger or pen is moving while touching the touch panel 70a (hereafter Touch-Move).

A finger or pen, which is touching the touch panel 70a, is released from the touch panel 70a, that is, touch is ended (hereafter Touch-Up).

Nothing is touching the touch panel 70a (hereafter Touch-Off).

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers and pen is detected.

These operations, states and coordinates of the positions of the fingers or pen touching the touch panel 70a are notified to the system control unit 50 via the internal bus. Then, based on the notified information, the system control unit 50 determines the kind of operation (touch operation) that was performed on the touch panel 70a. For Touch-Move, the system control unit 50 can also determine the moving direction of the finger or pen moving on the touch panel 70*a*, based on the change of the positional coordinates, for the vertical components and the horizontal components on the touch panel 70*a* respectively. If Touch-Move is detected for at least a predetermined distance, the system control unit 50 determines that the slide operation was performed. An operation of quickly moving a finger on the touch panel 70*a* for a certain distance in the touched state and releasing the finger is called "flick". In other words, flick is an operation of moving and releasing the finger rapidly on the touch panel 70*a*. If Touch-Move is detected for at least a predetermined distance at a predetermined speed or faster, and Touch-Up is detected thereafter, the system control unit 50 then determines that flick was performed (determines that flick was performed after the slide operation). Further, a touch operation of touching a plurality of points (e.g. two points) simultaneously and moving these touch positions closer together is called "Pinch-In", and a touch operation of moving these touch positions further apart is called "Pinch-Out". Pinch-In and Pinch-Out are collectively called a "Pinch Operation" (or simply "Pinch"). For the touch panel 70*a*, various types of touch panels may be used, such as a resistive film type, a capacitive type, a surface elastic wave type, an infrared type, an electromagnetic induction type, an image recognition type and an optical sensor type. There is a type of detecting a touch when the touch panel is actually contacted, and a type of detecting a touch when a finger or pen approaches the touch panel, but either type may be used.

Processing Content

Moving Image Capturing Processing

FIG. 3A is a flow chart depicting a moving image capturing processing (moving image recording processing) of the digital camera 100 according to the present embodiment. The moving image capturing processing is implemented by the system control unit 50 developing the program, which is recorded in the non-volatile memory 56, in the system memory 52, and executing the developed program. The following processing is executed if the LV button 76 is pressed in the moving image capturing mode.

In S101, the system control unit 50 determines whether the image capturing mode currently set is the HDR mode. In the present embodiment, an example when the "HDR mode" or the "SDR mode" can be set for the image capturing mode will be described. The "HDR mode" is a mode to capture a moving image that includes a high dynamic range (HDR) image. The "SDR mode" is a mode to capture a moving image that includes a standard dynamic range (SDR) image. In the following, a moving image that includes an HDR image is called an "HDR moving image", and a moving image that includes an SDR image is called an "SDR moving image". Processing advances to S102 if the image capturing mode is not the HDR mode (if the image capturing mode is the SDR mode), or to S103 if the image capturing mode is the HDR mode.

In S102, the system control unit 50 acquires RAW data via the memory control unit 15, and develops the RAW data as the SDR image having "color gamut: BT. 709; gamma: γ 2.2 (sRGB); bit depth: 8 bits". The color gamut may be a color gamut other than BT. 709 (e.g. BT. 2020).

In S103, the system control unit 50 acquires RAW data via the memory control unit 15, and develops the RAW data as the HDR image having "color gamut: BT. 2020; gamma: perceptual quantization (PQ) method; bit depth: 10 bits". The bit depth may be 12 bits or more instead of 10 bits.

Here the method of developing an image from the RAW data, performed in S102 and S103, will be described. First, the system control unit 50 adjusts white balance and complements colors for the RAW data (mosaic image), so as to generate a color image. Then the system control unit 50 performs gamma conversion and adjusts color brightness for the generated color image, so as to generate a developed image (SDR image or HDR image in the present embodiment). Here, the gamma characteristic (gradation conversion curve) in the gamma conversion is different between the SDR image and the HDR image. For the SDR image, it is assumed that the development for a standard display is performed. For the gamma characteristic of the SDR image, an inverse of the gamma characteristic of a standard monitor is used. For the HDR image, it is assumed that the development for an HDR display is performed. The gamma characteristic of the HDR image is, for example, a PQ type transfer function specified in ITU-R recommended BT. 2100: "Image parameter values for high dynamic range television for use in production and international programme exchange". Another example of the gamma characteristic of the HDR image is the hybrid log gamma (HLG) type transfer function specified in ITU-R recommended BT. 2100. In the present embodiment, an example of using the PQ type transfer function as the gamma characteristic of the HDR image will be described.

In S104, the system control unit 50 determines whether the current frame is the first frame of the moving image (first frame after the moving image capturing starts). Processing advances to S105 if the current frame is the first frame, or to S106 if not.

In S105, the system control unit 50 generates a thumbnail image based on the developed image. In the present embodiment, an example when the thumbnail image is an image in JPEG format will be described. The processing to generate the thumbnail image will be described later.

In S106, the system control unit 50 compresses the developed image as the moving image. The system control unit 50 may switch the compression method depending on the image capturing mode. For example, in the case of SDR mode, the system control unit 50 may compress the SDR image with H264, and in the case of the HDR mode, the system control unit 50 may compress the HDR image with H265.

In S107, the system control unit 50 records the compressed moving image in the recording medium 200 via the recording medium I/F 18.

In S108, the system control unit 50 determines whether an instruction to end the moving image capturing processing was received. In the present embodiment, the system control unit 50 determines that the instruction to end the moving image capturing processing was received when the LV button 76 is pressed again. Processing advances to S109 if the moving image capturing ends, or to S101 if not (moving image capturing continues).

In S109, the system control unit 50 generates meta information. The meta information is generated based on the image capturing mode when the moving image was captured, the moving image capturing time, and the setting of the camera when the moving image was captured, for example.

In S110, the system control unit 50 records the file information, which includes the meta information and the thumbnail information, to the recording medium 200 via the recording medium I/F 18.

In the case of the example in FIG. 3A, the processing in S101 to S108 is performed for each frame while the moving image is captured, but the timing to perform each processing is not particularly limited. For example, the processing to record the moving image (S107) may be performed for each predetermined frame, or may be performed for each writing unit of the recording medium. Further, in the example in FIG. 3A, the thumbnail image is generated using the first frame, but the frame used for the thumbnail image is not limited to the first frame. For example, a frame specified by the user may be used, or in the case of using a PRE-REC function to start the moving image recording from a frame at several seconds before pressing the LV button 76, the frame at the point when the LV button 76 is pressed may be used for the thumbnail image.

Thumbnail Image Generation Processing: S105

FIG. 3B is a flow chart depicting the thumbnail image generation processing of the digital camera 100 according to the present embodiment.

In S121, the system control unit 50 determines whether the currently set image capturing mode is the HDR mode in order to determine whether the moving image is the HDR moving image. Processing advances to S122 if the image capturing mode is not the HDR mode (in the case of the SDR mode), or to S123 if the image capturing mode is the HDR mode.

In S122, the system control unit 50 converts the color gamut of the SDR image into the color gamut of the thumbnail image. In concrete terms, the system control unit 50 converts the color gamut (BT. 709) of the SDR image developed in S102 into the color gamut (BT. 601) of the image specified in JPEG. In the present embodiment, the SDR image developed in S102 is an image having "color gamut: BT. 709; gamma: γ 2.2; bit depth: 8 bits". The image specified in JPEG is an image having "color gamut: BT. 601; gamma: γ 2.2; bit depth: 8 bits".

In S123, the system control unit 50 converts the bit depth of the HDR image into the bit depth of the thumbnail image. In concrete terms, the system control unit 50 does not convert the color gamut and the gamma of the HDR image developed in S103, but converts the bit depth (10 bits) thereof into the bit depth (8 bits) of the image specified in JPEG. By not converting gamma, a more accurate image (thumbnail image) with a wider dynamic range can be acquired and displayed. Furthermore, by not converting the color gamut, an image (thumbnail image) having more accurate colors can be acquired and displayed. If the bit depth of the HDR moving image is decreased from 10 bits to 8 bits, then such a problem as banding, which is the appearance of pseudo-contours that look like contour lines, may be generated in gradation, resulting in a considerable drop in image quality. In the present embodiment, however, the bit depth of the thumbnail image (reduced image) is decreased from 10 bits to 8 bits, which can prevent the above-mentioned problem. In the present embodiment, the HDR image developed in S103 is an image having "color gamut: BT. 2020; gamma: PQ method; bit depth: 10 bits". The image after the conversion is an image having "color gamut: BT. 2020; gamma: PQ method; bit depth: 8 bits". In S123, an example of the system control unit 50 converting the bit depth of the HDR image without converting the color gamut and the gamma of the HDR image was described, but the bit depth and the color gamut may be converted without the gamma being converted.

In S124, the system control unit 50 resizes (reduces) the size of the converted image to the size of the thumbnail image (e.g. 160 pixels×120 pixels).

In S125, the system control unit 50 performs JPEG compression on the resized thumbnail image.

Thumbnail Display Processing

FIG. 4A is a flow chart depicting the thumbnail display processing (one moving image reproduction processing) of the digital camera 100 according to the present embodiment.

In the thumbnail display processing, the system control unit 50 develops a program, which is recorded in the non-volatile memory 56, in the system memory 52, and executes the developed program. In the present embodiment, the following processing is executed if the reproduction button 79 is pressed.

In S201, the system control unit 50 reads file information including the meta information of the moving image and the thumbnail information from the recording medium 200 via the recording medium I/F 18.

In S202, the system control unit 50 decodes the JPEG-compressed thumbnail image that has been read.

In S203, the system control unit 50 determines whether the moving image is the HDR moving image. In the present embodiment, the system control unit 50 determines whether the image capturing mode when the moving image was captured, recorded in the meta information, is the HDR mode. Processing advances to S204 if the moving image is not the HDR moving image (if the moving image is the SDR moving image), or to S205 if the moving image is the HDR moving image.

In S204, the system control unit 50 displays the decoded thumbnail image, on the display unit 28 or the external apparatus 300, as the SDR image (color gamut: BT. 601; gamma: γ 2.2; bit depth: 8 bits). The system control unit 50 may perform further processing in accordance with the display setting of the display unit 28 or the external apparatus 300. For example, if the display setting of the display unit 28 or the external apparatus 300 is the setting to display the HDR image, the system control unit 50 may display the thumbnail image after switching the display setting to the setting to display the SDR image. Further, if the display setting of the display unit 28 or the external apparatus 300 is the setting to display the HDR image, the system control unit 50 may perform pseudo-conversion on the dynamic range of the thumbnail image from SDR to HDR, and display the converted thumbnail image (HDR image).

In S205, the system control unit 50 converts the bit depth (8 bits) of the decoded thumbnail into the bit depth (10 bits) of the HDR image. In this case, the system control unit 50 does not convert the gamma (PQ method) of the thumbnail image. The system control unit 50 may be regarded as an output unit that generates and outputs an output image by converting the bit depth of the thumbnail image into the bit depth of the HDR image.

In S206, the system control unit 50 displays the converted thumbnail image, on the display unit 28 or the external apparatus 300, as the HDR image (color gamut: BT. 2020; gamma: PQ method; bit depth: 10 bits). The system control unit 50 may perform further processing in accordance with the display setting of the display unit 28 or the external apparatus 300. For example, if the display setting of the display unit 28 or the external apparatus 300 is the setting to display the SDR image, the system control unit 50 may switch the display setting to the setting to display the HDR image, and then display the thumbnail image. If the display setting of the display unit 28 or the external apparatus 300 is the setting to display the SDR image, the system control unit 50 may convert the dynamic range of the thumbnail image from HDR into SDR, and then display the converted thumbnail image (SDR image).

In the case where a plurality of moving images are recorded in the recording medium 200, the system control unit 50 displays a plurality of thumbnail images on the display unit 28 or the external apparatus 300.

Moving Image Reproduction Processing

FIG. 4B is a flow chart depicting the moving image reproduction processing (moving image continuous reproduction processing) of the digital camera 100 according to the present embodiment. The following processing is executed if a thumbnail image is selected by pressing the SET button 75 in the state where the thumbnail image is being displayed.

In S211, the system control unit 50 reads the moving image data from the recording medium 200 via the recording medium I/F 18.

In S212, the system control unit 50 decodes the moving image data that was read.

In S213, the system control unit 50 determines whether the moving image is the HDR moving image. In the present embodiment, the system control unit 50 determines whether the image capturing mode when the moving image was captured, recorded in the meta information, is the HDR mode. Processing advances to S214 if the moving image is not the HDR moving image (if the moving image is the SDR image), or to S215 if the moving image is the HDR moving image.

In S214, the system control unit 50 displays the decoded moving image on the display unit 28 or the external apparatus 300 as an SDR image. The system control unit 50 may perform further processing in accordance with the display setting of the display unit 28 or the external apparatus 300. For example, if the display setting of the display unit 28 or the external apparatus 300 is the setting to display the HDR image, the system control unit 50 may display a moving image (SDR moving image) after switching the display setting to the setting to display the SDR image. Further, if the display setting of the display unit 28 or the external apparatus 300 is the setting to display the HDR image, the system control unit 50 may perform pseudo-conversion on the dynamic range of the moving image from SDR into HDR, and then display the converted moving image (HDR moving image).

In S215, the system control unit 50 displays the decoded moving image on the display unit 28 or the external apparatus 300 as an HDR image. The system control unit 50 may perform further processing in accordance with the display setting of the display unit 28 or the external apparatus 300. For example, if the display setting of the display unit 28 or the external apparatus 300 is the setting to display the SDR image, the system control unit 50 may switch the display setting to the setting to display the HDR image, and then display the moving image (HDR moving image). If the display setting of the display unit 28 or the external apparatus 300 is a setting to display an SDR image, the system control unit 50 may perform pseudo-conversion on the dynamic range of the moving image from HDR into SDR, and then display the converted moving image (SDR moving image).

In S216, the system control unit 50 determines whether the reproduction of the moving image is stopped. In the present embodiment, the system control unit 50 stops the reproduction of the moving image when the SET button 75 is pressed again or the moving image data is reproduced until the final frame. Processing advances to S211 if the reproduction of the moving image is continued (S216: NO) or, if the reproduction of the moving image is stopped (S216: YES), ends the reproduction processing of the moving image.

Advantageous Effect of the Present Embodiment

As described above, when the HDR moving image is recorded in the present embodiment, the digital camera 100 generates a thumbnail image by converting the bit depth of the HDR image (10 bits→8 bits) without converting the gamma of the HDR image. Then when the thumbnail image of the HDR moving image is displayed, the digital camera 100 converts the bit depth of the thumbnail image that has been read (8 bits→10 bits), and displays the converted image. Thereby the thumbnail image of the HDR moving image can be displayed at HDR image quality.

Modification

While the present invention has been described with reference to the preferred embodiment, the present invention is not limited to the embodiment, but may be modified and changed in various ways within the scope of the essence thereof. For example, in the above embodiment, whether the moving image is the HDR moving image or not is determined based on whether the image capturing mode when the moving image was captured, recorded in the meta information, is the HDR mode or not. However, the dynamic range information (SDR or HDR) of the moving image may be recorded in the meta information in advance, so that whether the moving image is the HDR moving image or not is determined based on this dynamic range information. Further, in the embodiment described above, the present invention is applied to the digital camera, but the present invention is not limited to the present embodiment, and may be applied to an electronic apparatus having the image capturing function (e.g. smartphone, notebook PC with camera).

The above-mentioned digital camera may be regarded as an image processing apparatus that includes an acquisition unit that acquires a moving image and a generation unit that generates thumbnail image by converting at least one of: the color gamut, the gamma and the bit depth of the frame image included in the moving image. If the moving image is a moving image that includes the HDR image, the generation unit generates the thumbnail image by reducing the number of bits of the frame image to the number of bits of the thumbnail image without converting the gamma of the frame image.

According to the present invention, the thumbnail of the HDR moving image can be displayed at HDR image quality.

The present invention is applicable not only to the imaging apparatus main unit, such as a digital camera, but also to a control apparatus that communicates with an imaging apparatus (including a network camera) wirelessly or via cable and controls the imaging apparatus remotely. The control apparatus that remotely controls the imaging apparatus is, for example, such an electronic apparatus as a smartphone, a tablet PC and a desktop PC. The imaging apparatus can be remotely controlled by being notified of commands to cause the imaging apparatus to perform various operations and settings based on the operation or processing on the control apparatus side. The control apparatus may receive the LV image captured by the imaging apparatus wireless or via cable, and display the LV image.

The present invention as described above is applied to the digital camera as an example, but is not limited to this. For example, the present invention can be applied to an electronic apparatus that includes a display, such as a PDA, portable telephone terminal, portable type image viewer, printer that includes a display, digital photo frame, music player, game machine and electronic book reader.

The present invention is not limited to the above-mentioned embodiment, but may be changed and modified in various ways without departing from the spirit and scope of the invention. The above embodiment is not intended to limit the invention according to claims. Various characteristics were described in the embodiment, but all of the plurality of characteristics are not necessarily essential to the invention, and a plurality of characteristics may be combined arbitrarily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-115381, filed on Jun. 21, 2019, which is hereby incorporated by reference herein in its entirety.

What is claimed is:

1. An image processing apparatus comprising at least one memory and at least one processor which function as:
an acquisition unit configured to acquire a moving image; and
a generation unit configured to generate a thumbnail image from the moving image,
wherein in a case where the moving image is a high dynamic range (HDR) moving image, the generation unit generates the thumbnail image of which gamma is equal to a gamma of the moving image and bit depth is lower than a bit depth of the moving image.

2. The image processing apparatus according to claim 1, wherein the generation unit is further configured to generate the thumbnail image by converting the bit depth of the moving image without converting the gamma of the moving image in a case where the moving image is a high dynamic range (HDR) moving image.

3. The image processing apparatus according to claim 1, wherein the bit depth of the thumbnail image is equal to the bit depth of a standard dynamic range (SDR) moving image.

4. The image processing apparatus according to claim 1, wherein the gamma of the moving image is a transfer function of a perceptual quantization (PQ) method.

5. The image processing apparatus according to claim 1, wherein the at least one memory and the at least one processor further function as an output unit configured to output an output image,
the output unit is further configured to output the output image generated by converting a bit depth of the thumbnail image into the bit depth of the moving image in a case where the moving image is an HDR moving image.

6. The image processing apparatus according to claim 1, wherein the generation unit is further configured to generate the thumbnail image by converting the bit depth of the moving image without converting the gamma and a color gamut of the moving image in a case where the moving image is an HDR moving image.

7. The image processing apparatus according to claim 1, wherein the generation unit is further configured to generate the thumbnail image without converting the bit depth of the moving image in a case where the moving image is a standard dynamic range (SDR) moving image.

8. The image processing apparatus according to claim 7, wherein the generation unit is further configured to generate the thumbnail image without converting the gamma and the bit depth of the moving image in the case where the moving image is an SDR moving image.

9. The image processing apparatus according to claim 1, wherein the generation unit is further configured to generate the thumbnail image by converting a color gamut of the moving image in a case where the moving image is a standard dynamic range (SDR) moving image.

10. The image processing apparatus according to claim 1, wherein the generation unit is further configured to generate the thumbnail image from a frame image included in the moving image.

11. An imaging apparatus, comprising:
the image processing apparatus according to claim 1; and
an image capturing apparatus that captures the moving image.

12. An image processing method, comprising:
an acquisition step of acquiring a moving image;
a generation step of generating a thumbnail image from the moving image,
wherein in a case where the moving image is a high dynamic range (HDR) moving image, the thumbnail image of which gamma is equal to a gamma of the moving image and bit depth is lower than a bit depth of the moving image is generated in the generation step.

13. A non-transitory computer readable medium that stores a program,
wherein the program causes a computer to execute an image processing method, and
the image processing method includes:
an acquisition step of acquiring a moving image; and
a generation step of generating a thumbnail image from the moving image,
wherein in a case where the moving image is a high dynamic range (HDR) moving image, the thumbnail image of which gamma is equal to a gamma of the moving image and bit depth is lower than a bit depth of the moving image is generated in the generation step.

* * * * *